US008458325B2

(12) United States Patent
Hansaki

(10) Patent No.: US 8,458,325 B2
(45) Date of Patent: Jun. 4, 2013

(54) INFORMATION PROCESSING APPARATUS FOR EXECUTING DETECTION OF A TARGET NETWORK DEVICE AND ITS METHOD

(75) Inventor: Tomoyuki Hansaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 12/750,274

(22) Filed: Mar. 30, 2010

(65) Prior Publication Data
US 2010/0250741 A1  Sep. 30, 2010

(30) Foreign Application Priority Data

Mar. 31, 2009  (JP) ................................. 2009-086156

(51) Int. Cl.
*G06F 15/173* (2006.01)
*G06F 15/16* (2006.01)

(52) U.S. Cl.
USPC ............................. 709/224; 709/245; 455/420

(58) Field of Classification Search
USPC .................. 709/223–224, 245–246; 370/328, 370/338, 463; 455/418–420
See application file for complete search history.

(56) References Cited

U.S. PATENT DOCUMENTS

| 7,111,303 | B2 * | 9/2006 | Macchiano et al. | 709/224 |
| 7,769,837 | B2 * | 8/2010 | Nogawa et al. | 709/228 |
| 7,912,928 | B2 * | 3/2011 | Tanaka et al. | 709/224 |
| 8,059,288 | B2 * | 11/2011 | Katano | 358/1.15 |
| 2003/0158956 | A1 * | 8/2003 | Tanaka et al. | 709/246 |
| 2006/0248230 | A1 * | 11/2006 | Kempf et al. | 709/245 |
| 2006/0274363 | A1 | 12/2006 | Katano | |
| 2007/0070940 | A1 * | 3/2007 | Vander Veen et al. | 370/328 |

FOREIGN PATENT DOCUMENTS

| JP | 2002-312265 A | 10/2002 |
| JP | 2006-340286 | 12/2006 |

\* cited by examiner

*Primary Examiner* — Bharat N Barot
(74) *Attorney, Agent, or Firm* — Canon USA Inc. IP Division

(57) ABSTRACT

An information processing apparatus which stores identification information (MAC address) for detection confirmation of a target network device in advance and executes detection of the target network device by comparing the stored identification information and identification information acquired from the network device on a network repeats executing a request by unicast to a part of addresses in a range of addresses to be detection target and then executing a request by broadcast or multicast until the target network device can be detected.

12 Claims, 9 Drawing Sheets

INFORMATION PROCESSING APPARATUS FOR EXECUTING DETECTION OF A TARGET NETWORK DEVICE AND ITS METHOD

BACKGROUND OF THE INVENTION

1. Field of the Invention

The present invention relates to an information processing apparatus for detecting a device connected to a network and its method.

2. Description of the Related Art

A local area network (LAN) has been spread in general homes. A device such as a printing device has been shared by a plurality of computers via the LAN. In the LAN in a home, Transmission Control Protocol/Internet Protocol (TCP/IP) is generally used. The TCP/IP identifies each device by an IP address and executes communication. However, allocation of addresses requires knowledge concerning the network. Thus, allocation of addresses is difficult for a general user without the knowledge.

Thus, in general homes, a router which connects the LAN to the Internet generally has a Dynamic Host Configuration Protocol (DHCP) server function to automatically allocate the IP address to a connected device using the function. Since the DHCP server dynamically allocates the IP address, the connected device is not necessarily allocated with the same address whenever it is started.

When a printing device is used from a computer that is a host device, the computer stores the IP address of the printing device, transmits data to the IP address, and executes communication. At this time, if an address different from the IP address to be stored by the computer is allocated to the printing device, the computer cannot identify a destination address for communicating with the printing device. Thus, the computer cannot execute communication with the printing device.

In order to solve this problem, there is a method for detecting a desired device using broadcast that transmits a packet to unspecified parties when communication cannot be executed with the IP address of the printing device that is stored in the computer. In this method, first the computer stores the IP address and a value specific to a device (e.g., media access control (MAC) address) of a target device to be used in advance. Then, the computer broadcasts inquiry about the IP address. A device which received this inquiry replies a response including the MAC address. When the response is received, the computer compares the specific value stored in the computer itself and a specific value included in the response, and checks whether there is the response from the target device. Further, by including the IP address in the response from the device, the IP address of the target device can be confirmed and updated.

Currently, with increase in security consciousness, fire wall software is spread in a home computer. A fire wall monitors network communication on the computer and restricts communication to prevent an unauthorized access from the outside. Settings of the fire wall software to maintain security may restrict communication by broadcast which is transmitted to unspecified host addresses. More specifically, for example, a response to the broadcast request transmitted by an application which operates on the computer is blocked by the fire wall and does not reach the application. In such the situation, a device allocated with an address different from the previous address by the DHCP server cannot be detected using the broadcast.

On the other hand, as a UNIX (registered trademark) operating system (OS), Linux (registered trademark) has been spread. Linux is software free of charge and the introduction thereof is becoming easy. Thus, even if a user who is not familiar with a computer may frequently use a Linux environment. Further, a case in which Linux is preinstalled on a computer has appeared. Linux includes various distributions, such as Fedora (registered trademark), Ubuntu (registered trademark), openSUSE (registered trademark) and the like. Using these distributions, various environments can easily be constructed. In many distributions, the fire wall software is basically introduced. Thus, the application cannot frequently freely be communicated using the broadcast. Change in the setting of the fire wall is often not desired by a user in terms of security. Further, the changing the setting itself may be difficult because a setting method is significantly different by environments.

As the prior art, Japanese Patent Application Laid-Open No. 2006-340286 discusses a method for detecting a device on a network even under an environment in which communication by the broadcast is restricted. In Japanese Patent Application Laid-Open No. 2006-340286, both of broadcast and unicast are used to detect the device. More specifically, when the unicast has normally been executed, the broadcast is tried to determine availability of the broadcast at that time. Based on a result of determination of the availability, the detection method is selected or is changed its order. The unicast is one-to-one communication to be executed by designating an IP address of the destination. Unlike the broadcast, the unicast is not communication with an unspecified number of devices. Thus, the communication by the unicast is rarely restricted by the fire wall. When a device on a network is detected using the unicast, communication will be individually executed with all addresses which can be present on the network by the unicast.

Detection of the device on the network by the unicast needs to try the detection on a one-to-one level to a large number of addresses. This processing includes time (timeout) necessary to wait for a response from each address and often takes long time to detect the device. If the detection of the device takes long time, a user may determine that the detection highly possibly fails and interrupt the detection. This is the same as that the device cannot be detected in terms of results.

Further, there are various types of the fire wall software, such as the software which is attached to a specific OS as standard or made by a third party. Thus, there is no general method for identifying settings of the fire wall software from other applications. Accordingly, even if it is set so that the communication by the broadcast is restricted by the fire wall, the application cannot identify the setting. In other words, when a response to the request transmitted by the broadcast is not received, its cause cannot be identified. As a cause for that the response to the request transmitted by the broadcast is not received, there is another reason such that the electric power source of the target device is not turned on. Currently, only the result that the application has failed in communication by the broadcast can be recognized but it cannot be distinguished whether the application is blocked by the fire wall or another reason.

SUMMARY OF THE INVENTION

When a target device is detected, it is desirable to detect the device as soon as possible in consideration of a setting of a fire wall and timing of electric power supply to the device. The present invention is directed to a method which can detect a device in various environmental conditions and improve an expected value of time required for the detection.

According to an aspect of the present invention, an information processing apparatus which stores identification information for detection confirmation of a target network device in advance and executes detection of the target network device by comparing the stored identification information for detection confirmation and identification information acquired from the network device on a network includes a setting unit configured to set a range of addresses to be targeted when the network device on the network is detected, a first detection unit configured to detect the target network device by requesting a response including the identification information of the network device from the network device on the network using broadcast or multicast, a second detection unit configured to detect the target network device by requesting a response including the identification information of the network device from the network device on the network using unicast in the range of addresses to be targeted set by the setting unit, and a control unit configured to perform control to repeat processing in which the first detection unit executes a request by the broadcast or the multicast, and when the response is not returned, the second detection unit executes a request by the unicast to a part of the addresses in the range of addresses to be targeted until the target network device can be detected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
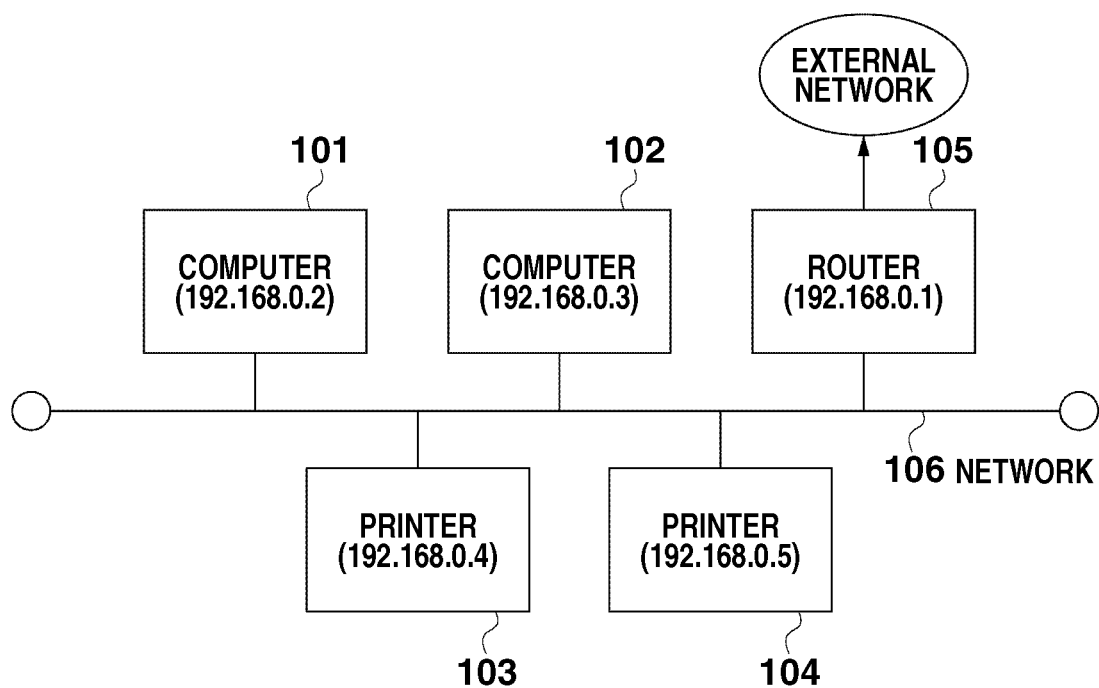
FIG. 1 illustrates an example of a network configuration according to an exemplary embodiment the present invention.

In FIG. 1, computers 101 and 102, printers 103 and 104, and a router 105 are connected to a network 106. Each device executes communication according to TCP/IP. The router 105 includes a DHCP server function and allocates an IP address to the computers 101 and 102, respectively. The router 105 is allocated an IP address 192.168.0.1. The computers 101 and 102, and the printers 103 and 104 are immediately allocated IP addresses 192.168.0.2 to 192.168.0.5 respectively after an electric power source is turned on.

Figure 2:
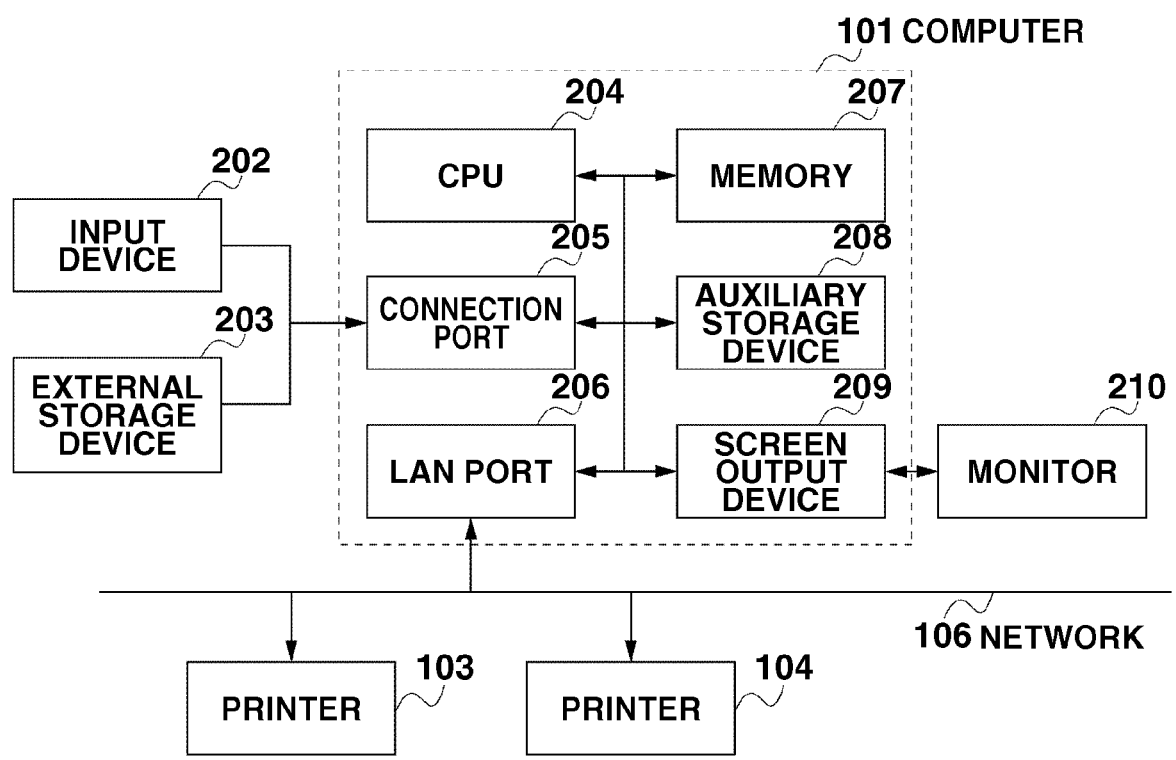
FIG. 2 illustrates an example of a hardware configuration of a computer according to an exemplary embodiment the present invention.

The computers 101 and 102 as an information processing apparatus have a configuration as illustrated in FIG. 2. The computer 101 includes a central processing unit (CPU) 204, a connection port 205, such as a serial port and a universal serial bus (USB) port, for connecting peripherals, a LAN port 206 for connecting to the network, a memory 207, an auxiliary storage device 208 such as a hard disk, and a screen output device 209 for outputting on a screen such as a video card. An input device 202 such as a keyboard, a mouse, and a scanner on an output port, and an external storage device 203 such as a USB memory, an external hard disk, a compact disc read only memory (CD-ROM) and a digital versatile disc (DVD)-ROM are connected to the connection port 205 such as a serial advanced technology attachment (SATA) port and a USB port. A monitor 210 is connected to an output terminal on the screen output device 209. The LAN port 206 is connected to the network 106. The printers 103 and 104 are also connected to the same network 106 as the computer 101.

Figure 3:
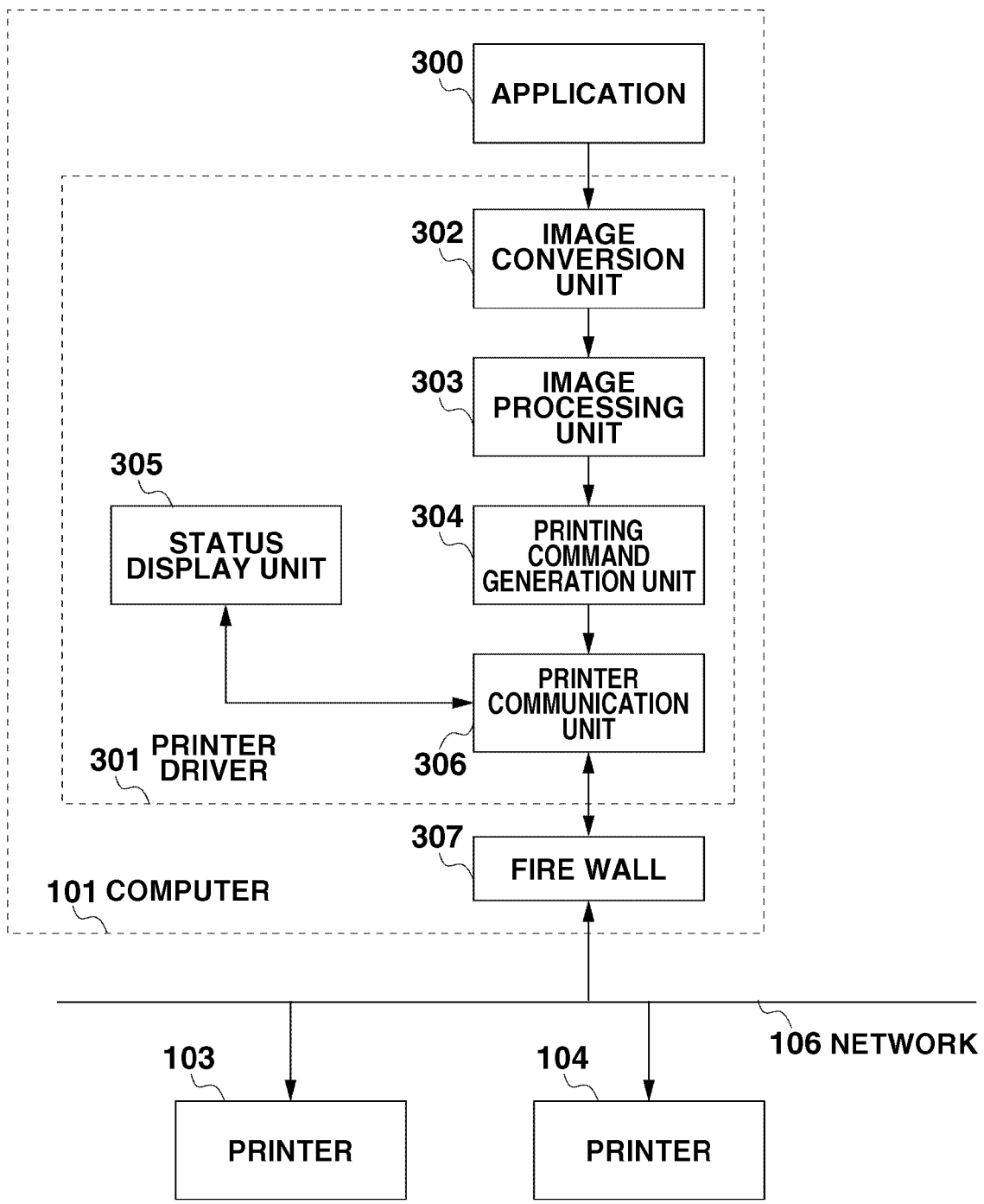
FIG. 3 illustrates an example of a software configuration including a printer driver according to an exemplary embodiment the present invention.

In the computer 101, software (here a printer driver) for detecting a printer to execute printing is installed. FIG. 3 illustrates a software configuration on the computer 101. The computer 101 includes an application 300, a printer driver 301, and a fire wall 307. The computer 102 also includes a configuration such as various applications and a fire wall.

The printer driver 301 includes an image conversion unit 302 configured to convert a red-green-blue (RGB) component that is an image data format into a cyan-magenta-yellow-black (CMYK) component suitable for printing, and an image processing unit 303 configured to perform image processing, such as error diffusion in response to a print setting designated by a user, on an image to convert into a format suitable for printing. The printer driver 301 includes a printing command generation unit 304 configured to generate a command which can be interpreted by a printer, a printer communication unit 306 configured to detect a printer, and transmit and receive a printing command, and a status display unit 305 configured to notify a user of the status of a printer.

In FIG. 3, it is assumed that the fire wall 307 is set in the computer 101 so that the printer driver 301 can perform communication by the broadcast. It is assumed that communication by the broadcast is restricted in the computer 102 by the setting of the fire wall 307.

Further, each of the computers 101 and 102 includes specific identification information for detection confirmation of the printer 103 in advance which is input by a user when the printer 103 is installed. In the present invention, the MAC address is used as the identification information for detection confirmation of a network device. However, a serial number, a network service name or the like of the device may be used.

Figure 5:
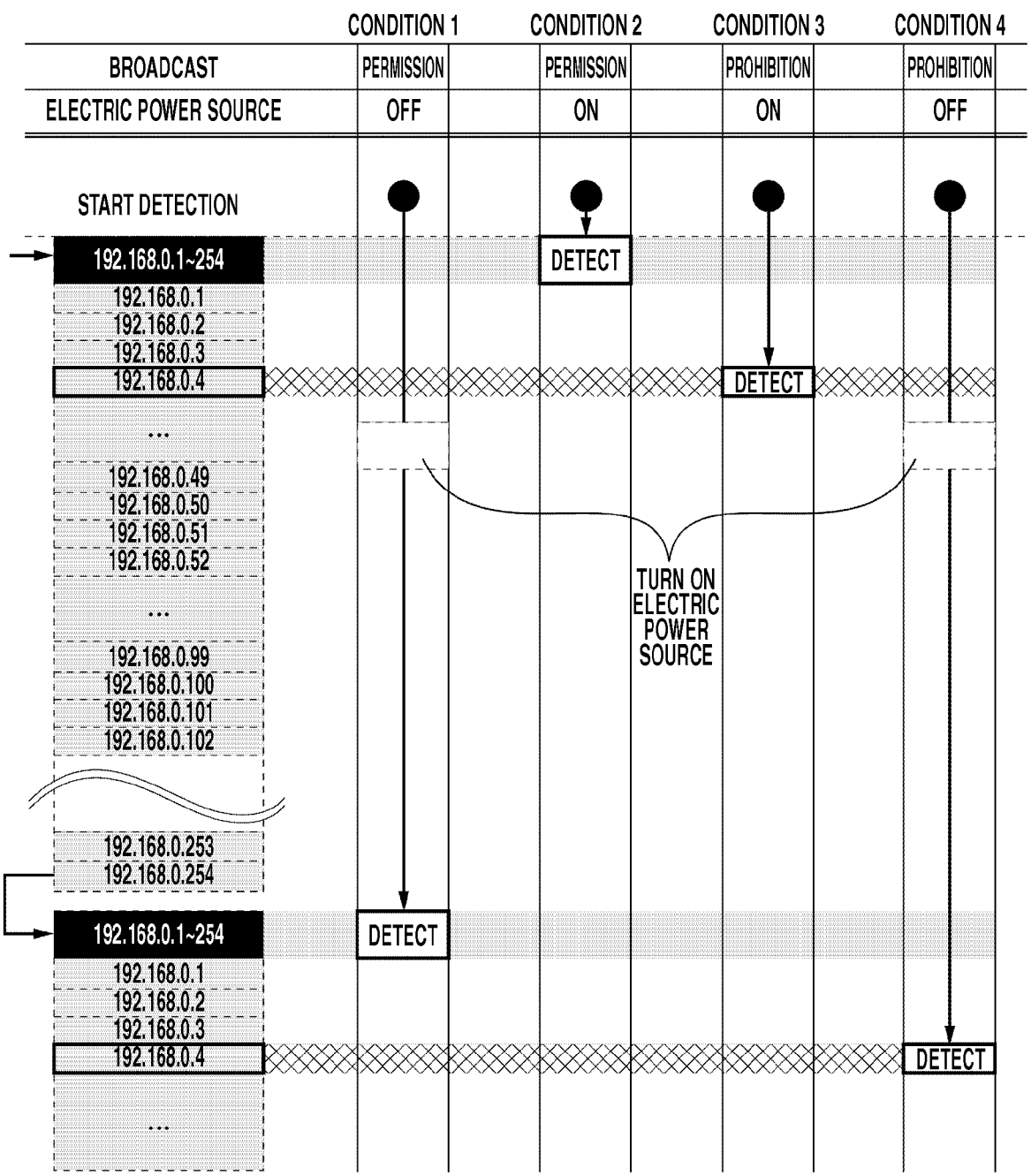
FIG. 5 illustrates detection timing of a device on a network.

FIG. 5 illustrates detection timing concerning an example of detection of a device on a network using both of the broadcast and the unicast. In FIG. 5, a simple detection method is used such that detection by the unicast is executed to all IP addresses (192.168.0.1 to 192.168.0.254) after the broadcast has been executed once. Further, in this detection method, the broadcast is executed again after predetermined time after the unicast to wait for its response. In FIG. 5, the address of a target printer to be detected is set to 192.168.0.4.

Two lines at the top in FIG. 5 denote a system environment. The upper line (broadcast) indicates whether communication by the broadcast is restricted (prohibition) or not (permission) by the setting of the fire wall. The lower line (electric power source) indicates a state of the electric power source of a network device (ON/OFF) before the printer driver 301 detects the device.

Condition 1 indicates a case in which the fire wall is set so as not to block communication by the broadcast, and at first, the electric power source of the printer is not turned on but after a start of detection of the device, the electric power source is turned on. This case assumes the state that when performing printing, a user realizes that the electric power source of the printer is not turned on after the printer driver starts detection of the printer and then turns on the electric power source of the printer. In the condition 1, if timing when the user turns on the electric power source is late (after unicast to address 192.168.0.4), as illustrated in FIG. 5, the printer cannot be detected until a second broadcast is executed.

Condition 2 indicates a case in which the fire wall is set so as not to block communication by the broadcast and the electric power source of the printer is turned on from the beginning. In this case, the target printer can be detected by the first broadcast.

Condition 3 indicates a case in which the fire wall is set so as to block communication by the broadcast and the electric power source of the printer is turned on from the beginning. In this case, the target printer can be detected by the unicast after the first broadcast.

Condition 4 indicates a case in which the fire wall is set so as to block communication by the broadcast and the electric power source of the printer is not turned on at the beginning. In the condition 4, if timing when the user turns on the electric power source is late (after unicast to address 192.168.0.4), as illustrated in FIG. 5, the printer is detected by the unicast after the second broadcast.

Figure 6:
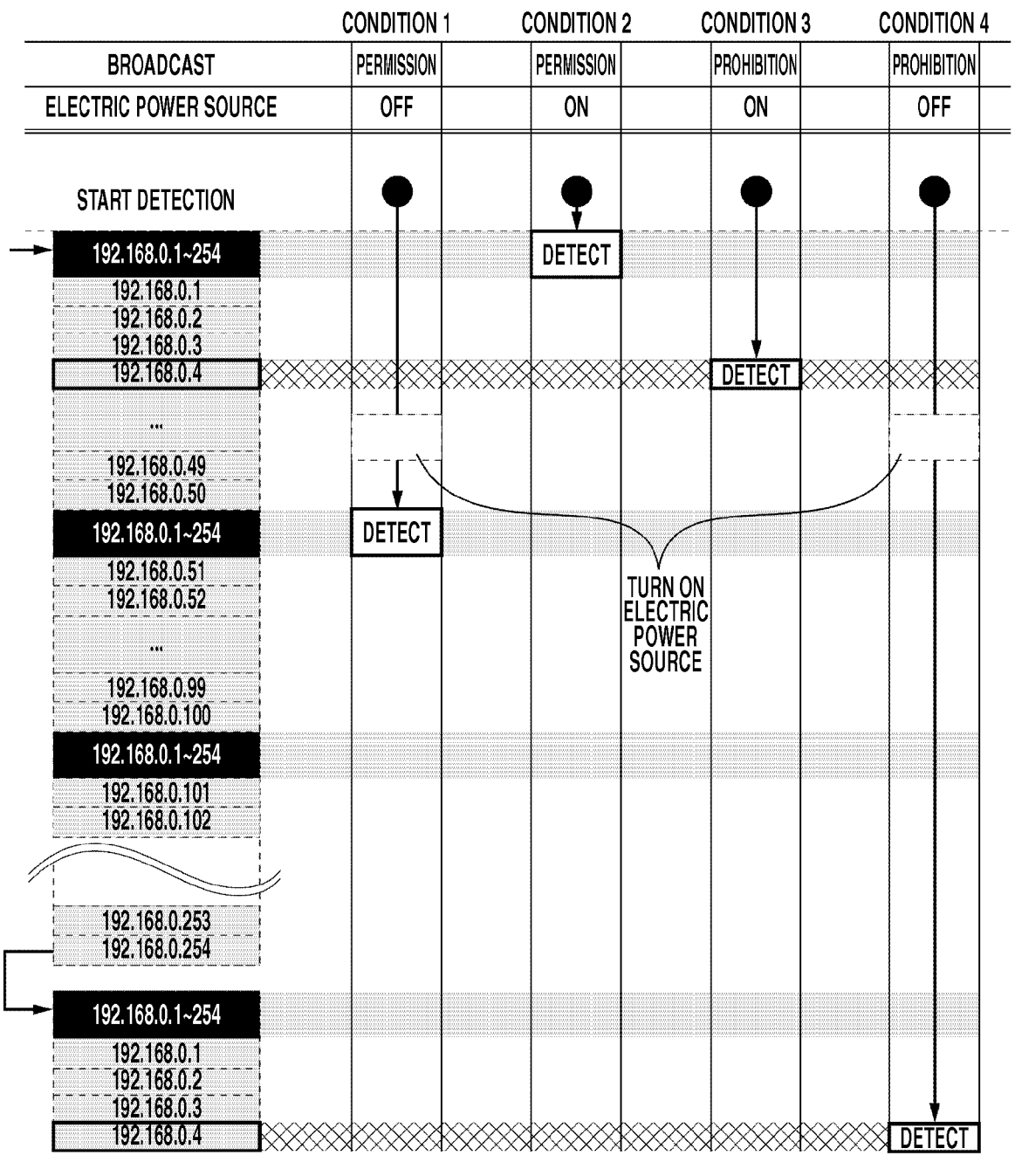
FIG. 6 illustrates detection timing of a device on a network when a detection method different from that in FIG. 5 has been used.

FIG. 6 illustrates detection timing of a detection method for detecting a device on the network which uses both of the broadcast as first detection processing and the unicast as second detection processing and is specific to the present invention. The illustrated conditions 1 to 4 are similar to those in FIG. 5.

In FIG. 6, specific processing on a computer will be described by giving an example in which printing is executed by the printer 103 under circumstances corresponding to the condition 1 illustrated in FIG. 6. It is assumed that the devices installed on the network include the computer 101, the printers 103 and 104, and the router 105.

First, when a user performs printing by the arbitrary application 300, the printer driver 301 receives appropriate image data from the application 300. Then, the printer driver 301 executes predetermined processing. The printer communication unit 306 starts detection processing of the printer on the network 106.

Figure 4:
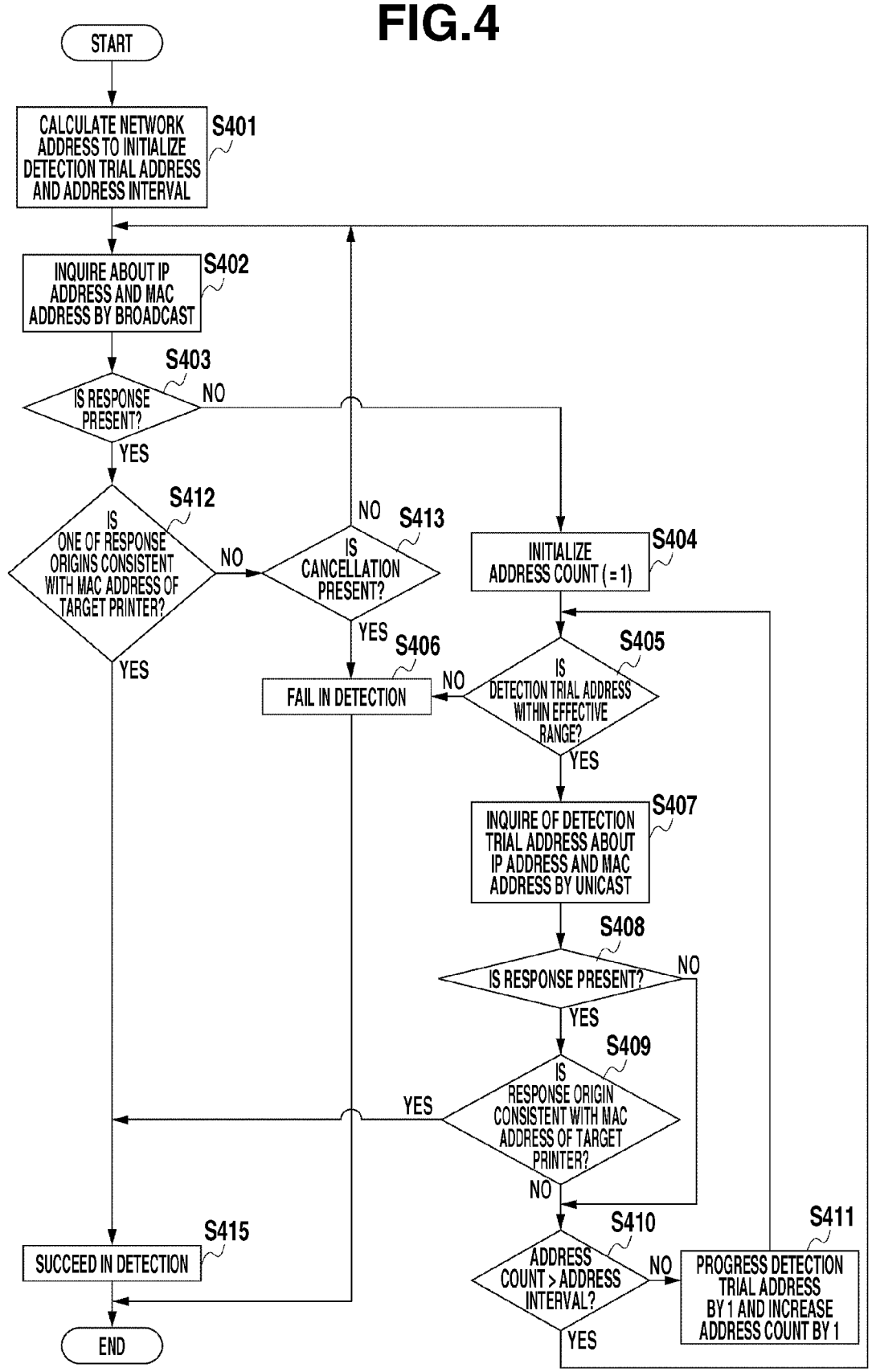
FIG. 4 illustrates a flowchart of detection processing of a device according to an exemplary embodiment the present invention.

Referring to FIG. 4, processing for detection in the printer communication unit 306 will be specifically described. The flowchart illustrated in FIG. 4 indicates processing steps to be realized by reading a program into a predetermined storage area and causing the CPU 204 to execute the program.

In step S401, the CPU 204 acquires network information about its computer 101 and calculates a network address which can be used on the network 106. Further, the CPU 204 initializes a detection trial address and an address interval. The detection trial address is an address to be tried in printer detection by the unicast. Furthermore, the address interval is a variable for determining timing to execute the broadcast. After addresses corresponding to the variable are tried by the unicast, the CPU 204 executes another detection by the broadcast.

In FIG. 4, it is assumed that a network address 192.168.0.0 and a subnet mask 255.255.255.0 are obtained as the network information. A range of the network is in a range in which a bit of the subnet mask is not set. Thus, the range of the network is set to 192.168.0.0 to 192.168.0.255. The first address 192.168.0.0 denotes the network address and the last address 192.168.0.255 denotes the broadcast address. Thus, addresses to be actually allocated to the device will be 192.168.0.1 to 192.168.0.254. A default 192.168.0.1 is set to the detection trial address. Further, in the present exemplary embodiment, a specified value (=50) is set as the address interval. This number is merely an example. Thus, the number may be suitably changed according to the number of addresses on the network.

In step S402, the CPU 204 transmits a command (request command) which inquires the MAC address and the IP address prepared as the printer command of the broadcast address (which is 192.168.0.255 or may be 255.255.255.255). Thus, the CPU 204 inquires the MAC address and the IP address from the device on the network 106. In step S402, multicast in which an unnecessary address is not designated in advance may be used instead of the broadcast.

In step S403, a response is returned from the device connected to the network 106 corresponding to the request command. In step S403, it is checked only there is the response or not. If at least one response is present (YES in step S403), the processing proceeds to step S412. If there is no response (NO in step S403), the processing proceeds to step S404.

Under circumstances as the above-described condition 1, the fire wall 307 is set so that the printer driver 301 on the computer 101 can executes communication by the broadcast. However, the printer driver 301 itself cannot identify the setting of this fire wall 307. Accordingly, in device detection using the broadcast address, the printer driver 301 receives a response from a printer or the like connected to a network 310 and can determine whether communication by the broadcast can be executed.

In step S403, under circumstances as the condition 1 (electric power source of both printers 103 and 104 are not turned on), a response from the network device is not present (NO in step S403). Then, the processing proceeds to step S405. There are several causes that a response from the network device is not received. However, at this point, the printer driver 301 cannot identify the cause. As the cause without a response, it is considered that the electric power source of the printers 103 and 104 is not turned on, the printers 103 and 104 are not connected to the network 106 or communication by the broadcast is blocked by the fire wall 307 on the computer 101.

Then, in steps S404 to S411, the CPU 204 will try printer detection by unicast search. In step S404, the CPU 204 initializes an address count which counts the number of detected addresses by the unicast (=1). Next, in step S405, the CPU 204 confirms whether the detection trial address is in an effective range. In this case, the effective range is addresses 192.168.0.1 to 192.168.0.254. If the detection trial address is within the effective range (YES in step S405), the processing proceeds to step S407. If the detection trial address is out of the effective range (NO in step S405), the processing proceeds to step S406. The processing proceeds to step S406 when the target printer cannot be found even if a trial by the unicast is executed to all addresses. Thus, it will be determined that the detection is failed. At this point, the CPU 204 notifies a user of the detection failure by the monitor 210 or the like. Then, the processing ends.

On the other hand, in step S407, the CPU 204 transmits a request command to the detection trial address by the unicast, and inquires about the IP address and the MAC address. In other words, the CPU 204 transmits the inquiry to an address 192.168.0.1. In step S408, the CPU 204 confirms whether there is a response to the request command. If a response is received (YES in step S408), the processing proceeds to step S409. If there is no response (NO in step S408), the processing proceeds to step S410. For example, when the request command has been transmitted to the address 192.168.0.1, since it is the address of the router 105, a response corresponding to the request command is not returned.

In step S409, the CPU 204 determines whether the MAC address of the response origin is consistent with the address of the target printer. If the addresses are consistent with each other (YES in step S409), the processing proceeds to step S415. If not, (NO in step S409), the processing proceeds to step S410.

In step S410, the CPU 204 confirms the number of addresses (address count) checked by the unicast and determines whether 50 addresses in the address interval have been checked. If the unicast is executed as the number of the address interval (YES in step S410), the processing once returns to step S402 to execute the broadcast. If the unicast is not executed as the number of the address interval (NO in step S410), the processing proceeds to step S411. In step S411, the CPU 204 progresses the detection trial address by 1 and increases the address count by 1. Under circumstances as the above-described condition 1, at the timing when the first unicast is completed, the detection trial address will be set to 192.168.0.2 and the address count will be set to 2 in step S411.

Then, the CPU 204 repeats processing of steps S405 to 5411 by the number of the address intervals and tries printer detection by the unicast. In the example of the above-described condition 1, the electric power source of the printer 103 is turned on after detection by the unicast of an address 192.168.0.4 is completed. Thus, the detection trial address proceeds until an address 192.168.0.50 without receiving a response from the target printer. Then, in step S410, the address count exceeds the address interval. Thus, the processing returns to step S402 and the CPU 204 will execute the broadcast.

In the example of the above-described condition 1, in step S402, the CPU 204 executes inquiry by the broadcast. In step S403, the CPU 204 determines whether there is a response. Since the electric power source of the printer 103 is turned on at this point, the CPU 204 receives a response from the printer 103 (YES in step S403). Thus, the processing proceeds to step S412.

In step S412, the CPU 204 checks whether a printer which returns the response is the target printer 103. The CPU 204 determines whether the MAC address included in the responded data is consistent with the MAC address of the target printer which is stored in advance by the computer 101. When the target printer responds (YES in step S412), the processing proceeds to step S415. The CPU 204 determines that the detection is successful and terminates the processing. In the example of the above-described condition 1, the printer 103 will respond. Thus, the detection results in success. When the detection of the printer 103 is successful, it is obtained that the IP address of the printer is 192.168.0.4 by confirming the IP address included in the response data. Communication thereafter will be executed using the obtained IP address. More specifically, the printer communication unit 306 will transmit print data to the printer 103. The printer 103 will receive the print data and starts printing based on the print data.

On the other hand, in step S412, when a response from the target printer is not received (NO in step S412), for example, when a received response is returned from a device other than the printer 103, the processing proceeds to step S413. In step S413, the CPU 204 determines whether a cancellation instruction of printer search by a user is present. In this case, it is assumed that a cancellation instruction from the user is input when it takes too long to detect the target printer. If the cancellation instruction is present (YES in step S413), the processing proceeds to step S406. In step S406, it is determined that the detection results in failure and the processing ends. If the cancellation instruction is not present (NO in step S413), the processing proceeds to step S402. The processing will be repeated.

In step S413, it is described exceptional processing such that the processing is terminated without detecting the printer device according to the cancellation instruction from the user. As a cause that it takes long time to detect the target printer, it is considered that, since the printer driver receives a response by the broadcast, other than the setting of the fire wall, for example, the electric power source is not turned on to the target printer. Thus, the processing proceeds from step S413 to step S406. When detection failure is determined, the monitor 210 may display a message such as "Printer may not be turned on. After checking the power supply, do you search printer again?" to draw a user's attention.

The detection method of the device specific to the present invention has been specifically described above using environments of the condition 1 in FIG. 6 as an example. Detection timing of a printer other than that of the condition 1 in FIG. 6 will be described in detail below.

First, the condition 2 in FIG. 6 will be described. In this circumstance, in step S402, the printer 103 that is the target printer can be detected by the first broadcast.

Next, the condition 3 in FIG. 6 will be described. In this circumstance, first on the computer 101, communication by the broadcast of the printer driver is blocked by the fire wall (NO in step S403). Then, detection of the device by the unicast is executed. When the detection trial address is set to 192.168.0.4, the target printer will be detected (YES in step S409).

Further, the condition 4 in FIG. 6 will be described. First, on the computer 101, communication by the broadcast of the printer driver is blocked by the fire wall (NO in step S403). Then, detection of the device by the unicast is tried entirely from 192.168.0.1 to 192.168.0.245. During the detection, search by the broadcast is also tried corresponding to the above-described address interval. However, the target printer cannot be detected. In step S406, it is determined that the detection results in failure. In this case, the CPU 204 once notifies the processing unit (e.g., status display unit 305) which waits for a detected result of the printer driver 301 of detection failure.

The status display unit 305 may cause the monitor 210 to display a message to the effect that the target printer is not detected and "Printer may not be turned on. After checking the power supply, do you search printer again?" to draw a user's attention. This is because since the target printer is not detected even if the unicast is executed to all addresses, it is considered that the electric power source of the printer is not turned on. Further, the setting of the network or the like may be a cause of detection failure, thus, the status display unit 305 may notify the user of the cause of the detection failure by the display and prompt the user to retry detection of the device. By receiving the user instruction to execute printing processing or to retry detection of the device again, detection processing is started from step S401. Then, when the detection trial address is set to 192.168.0.4, detection of the target printer is successful.

According to the above described exemplary embodiment the present invention, when it is set to allow communication by the broadcast of the printer driver, even if the electric power source of the printer is not turned on in advance, the target printer can be detected at a relatively high speed (the conditions 1 and 2 in FIG. 6). Particularly, as compared with the detection method in FIG. 5, detection timing in the condition 1 is quicker. Particularly, in a home printer, the electric power source is not continuously turned on. The electric power source may not be turned on in printing start. Thus, the detection method of the device as illustrated in FIG. 6 is a particularly effective in such circumstance. Further, detection in such circumstance may be executed particularly at a high speed.

On the other hand, when communication by the broadcast of the printer driver is restricted by the fire wall, the detection method in FIG. 6 can detect the target printer at timing (conditions 3 and 4) which is comparable to that in the detection method in FIG. 5.

According to the exemplary embodiment of the present invention, detection is executed by the broadcast first, when the target printer is not found, only 50 IP addresses are detected by the unicast, and such processing is repeated. In the above description, the address interval detected by the unicast is fixed. However, the address interval affects detection timing. Thus it is desirable that the address interval is changed corresponding to circumstances. Further, the address interval may be changed during the detection processing. For example, an interval for executing the broadcast is made short at the beginning of the detection processing, and as the processing is progressed, the address interval may be gradually made longer to improve a detection speed in a start of the detection.

Further, in the present exemplary embodiment, an address of a target of unicast is made different every time. However, search of the target printer by the unicast may be executed by deliberately overlapping a part or the whole of addresses. Thus, for example, it is considered that the target printer can be detected at early timing based on timing when the electric power source is turned on.

Timing to execute the broadcast may be determined not by the number of addresses but by the range of addresses. Detection by the unicast may be executed and when completion of checking of a range of specific addresses is detected, detection by the broadcast may be executed. For example, it may be determined by confirming the last address in the range of addresses is detected. In other words, in determination in step S410, if the detection trial address is set to any one of 192.168.0.50, 192.168.0.100, 192.168.0.150, and 192.168.0.200, the broadcast may be executed.

Further, timing to execute the broadcast may be determined not by the number of checked addresses but by time. Detection by the unicast may be executed and then detection by the broadcast may be executed after every certain period of time. For example, determination in step S410 can be realized by determining whether 5 seconds or more have elapsed from the detection by the previous broadcast.

When the detection is successful, its result (IP address of the target printer) may be stored in a cache or the like. When detection is executed next time, an inquiry about the MAC address may be made to the cached IP address. When detection cannot be executed by information about the cache, processing as indicated in the exemplary embodiment of the present invention may be executed. As timing to execute detection based on the information about the cache, for example, a trial may be executed as the detection trial address before or after detection by the broadcast.

When the detection is successful, it may be considered to store which is executed the broadcast or the unicast to detect the target printer. If the target printer has previously been detected by the unicast, when next detection is executed, a detection order by the broadcast and the unicast may be automatically changed in the detection method based on this information.

When the detection according to the exemplary embodiment of the present invention is successful and the target printer is detected by the unicast, detection may be further tried by the broadcast to confirm whether a response from the target printer is returned. Accordingly, a cause that the target printer has not been detected can be determined whether communication by the broadcast is restricted by the fire wall. When a response to the broadcast is received, it can be understood that the cause that the target printer has not been detected is not due to that the communication by the broadcast is restricted by the fire wall.

For example, when it has been understood that the communication by the broadcast is not restricted by the fire wall, the broadcast may be executed for every predetermined time in next detection processing. Thus the target printer can be detected. In this case, notification to a user such as "Please check that electric power source of printer is turned on" may be displayed.

After the printer has been detected by the unicast, detection by the broadcast may be further executed. When a response is not returned from the target printer, detection by the unicast may be executed prior to that by the broadcast in the next detection processing. Thus, it is considered that efficiency in detection of the target printer may be increased. A message to prompt a user to change the setting of the fire wall may be provided to the user.

As described above, according to a detection result of the printer by the broadcast after detection of the target printer by the unicast, different notification may be provided to a user. Thus, it can prompt the user to execute processing which can efficiently execute next detection of the printer. In addition to the content of notification, as described above, it may be controlled so as to change the search method of the printer by the printer driver.

The above-described exemplary embodiment is an example which progresses processing by a single control system (thread). However, search may be simultaneously implemented by a plurality of control systems (multithread) to further reduce time required to detection.

Figure 7:
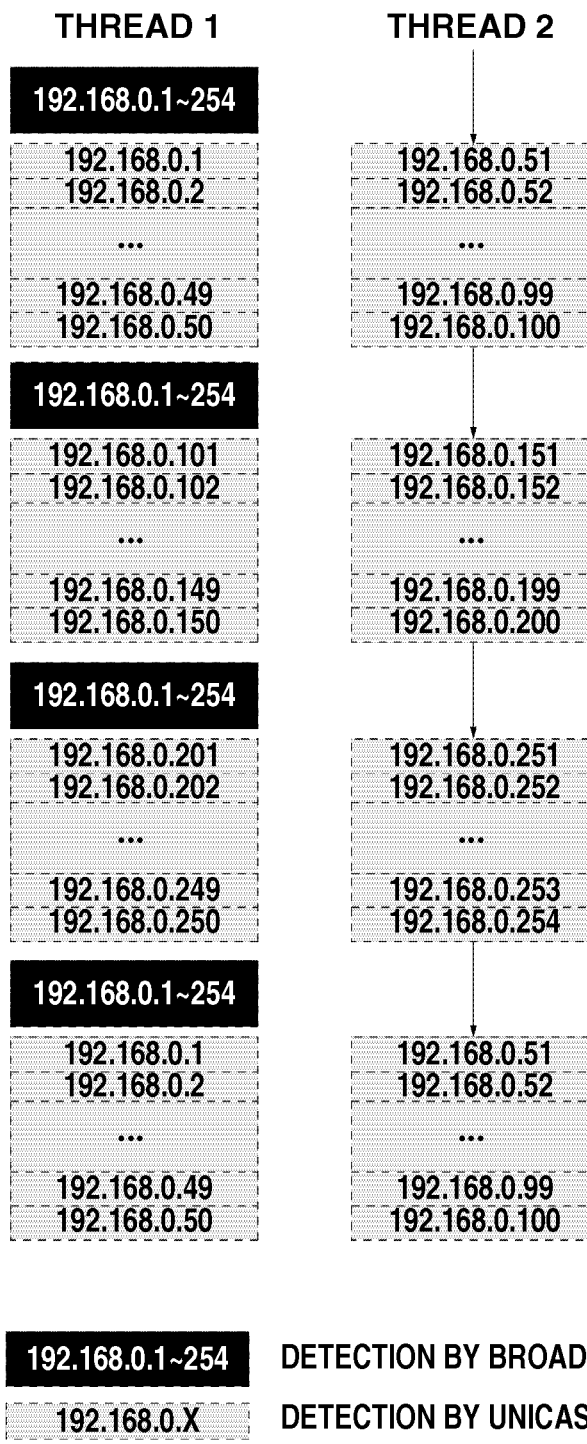
FIG. 7 illustrates an example in which detection of a device by unicast is executed by a multithread.

For example, as illustrated in FIG. 7, detection by the unicast after detection by the broadcast may be executed by a plurality of threads. In FIG. 7, detection is executed by two threads 1 and 2.

Figure 8:
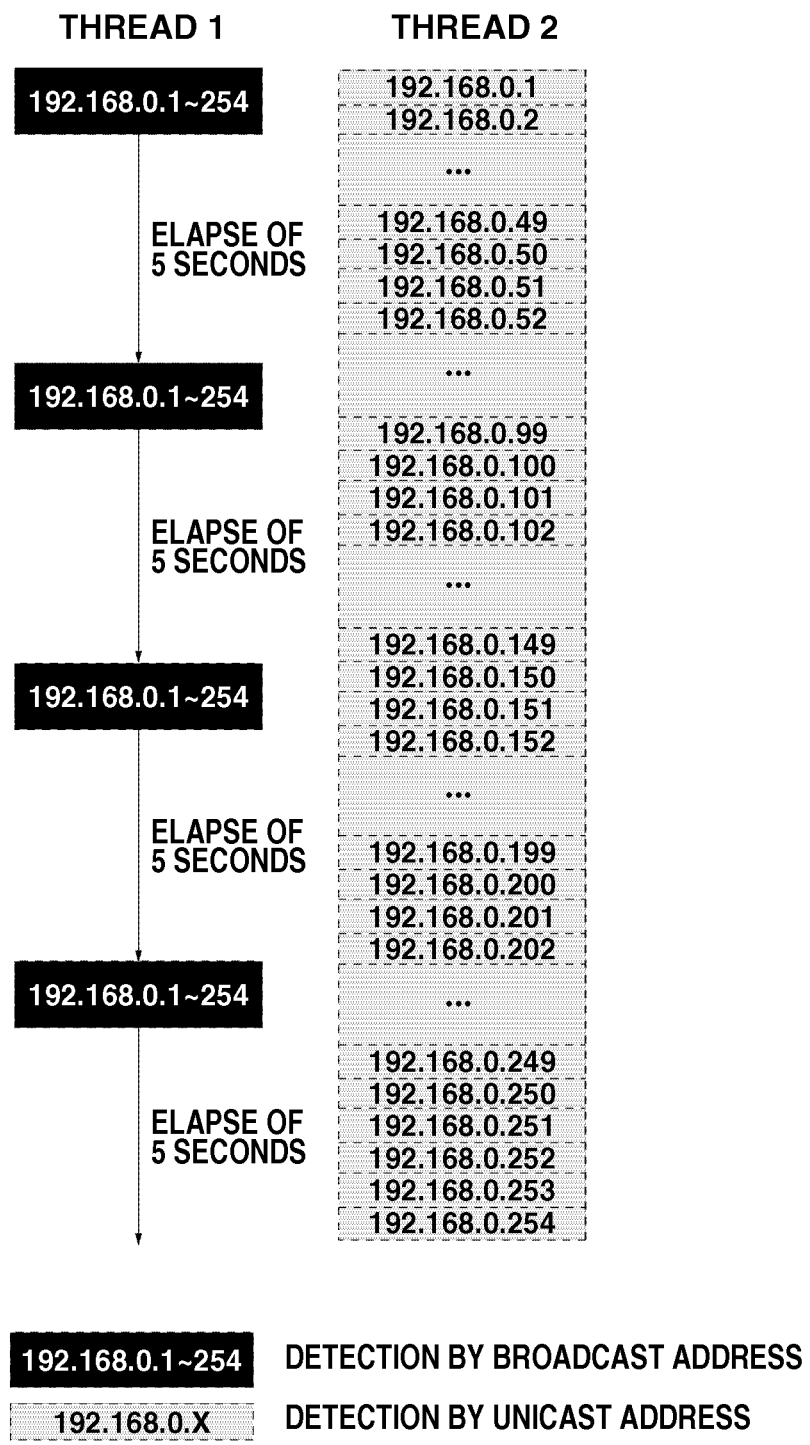
FIG. 8 illustrates an example in which in a multithread, one thread executes only broadcast detection for each fixed time and another thread executes only unicast detection.

Further, as illustrated in FIG. 8, if detection timing by the broadcast is determined by time, while detection by the broadcast is executed at a fixed interval (5 seconds) in thread 1, detection by the unicast may be executed in parallel therewith in thread 2. Detection by the broadcast may be executed together with detection by the unicast in one thread.

Figure 9:
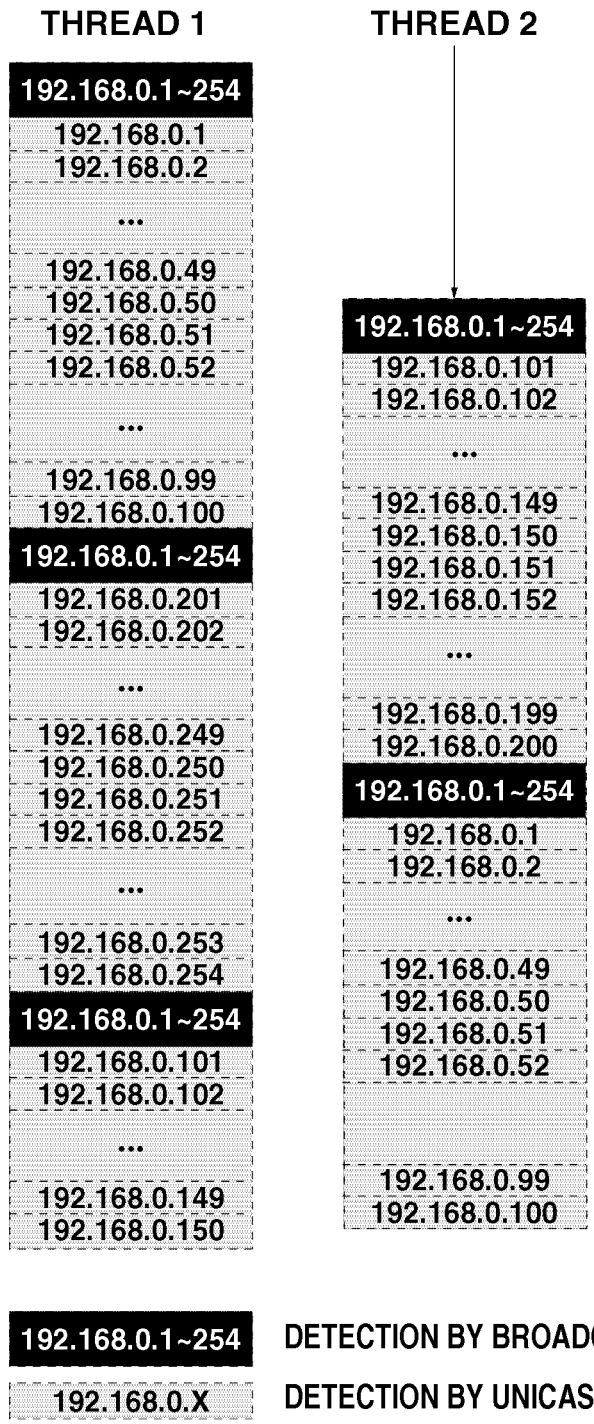
FIG. 9 illustrates an example of a method in which in a multithread, each thread executes both of broadcast detection and unicast detection.

As illustrated in FIG. 9, detection processing of the device in which the broadcast and the unicast are combined may be executed by a plurality of threads.

When detection processing is implemented by the multithread and detection by the broadcast is executed, detection by the unicast may be temporarily interrupted so as not to simultaneously execute communication of the unicast and the broadcast in consideration of a load on the network.

In the exemplary embodiment, it is described that the detection by the unicast is executed in ascending order from the address 192.168.0.1 as an example. However, the order is not limited to this. For example, the detection may be executed in descending order of the address, or executed from the vicinity of the computer address on the may be detected on a priority basis. Further, detection may be started from the address to be obtained by the previous detection result.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-086156 filed Mar. 31, 2009, which is hereby incorporated by reference herein in its entirety.

What is claimed is:

1. An information processing apparatus which stores identification information for detection confirmation of a target network device in advance and executes detection of the target network device by comparing the stored identification information for detection confirmation and identification information acquired from the network device on a network, the information processing apparatus comprising:
    a setting unit configured to set a range of addresses to be targeted when the network device on the network is detected;
    a first detection unit configured to detect the target network device by requesting a response including the identification information of the network device from the network device on the network using the broadcast or multicast;
    a second detection unit configured to detect the target network device by requesting a response including the identification information of the network device from the network device on the network using unicast in the range of addresses to be targeted set by the setting unit; and
    a control unit configured to control a process that includes:
    the first detection unit executes a request by the broadcast or the multicast, and
    repeating until the target network device can be detected,
        when the response is not returned from the target network device, the second detection unit executes a request by the unicast to a part of the addresses to which a request has not been executed in the range of addresses to be targeted, and
        when the target network has not been detected, the first detection unit executes a request by the broadcast or the multicast.

2. The information processing apparatus according to claim 1, wherein under control by the control unit, a part of the addresses in the range of addresses which are targeted for a trial by the second detection unit is determined by designating the number of addresses, time, or a predetermined address.

3. The information processing apparatus according to claim 1, wherein when the second detection unit detects the target network device based on control by the control unit, the first detection unit further executes a request by the broadcast or the multicast to try detection of the target network device to determine a cause that the target network device has not been detected.

4. The information processing apparatus according to claim 3, wherein when the second detection unit detects the target network device based on control by the control unit, different notification is provided to a user according to success or failure of detection of the target network device based on the request by the broadcast or the multicast which is tried by the first detection unit.

5. The information processing apparatus according to claim 1, further comprising a recording unit configured to record a result of previous detection of the network device,
    wherein the control unit causes the second detection unit to try detection of the network device to an address obtained from the result of previous detection of the network device recorded by the recording unit.

6. The information processing apparatus according to claim 1, further comprising a recording unit configured to record a result of previous detection of the network device,
    wherein the control unit executes detection of the target network device using any one of the first detection unit and the second detection unit according to the result of previous detection of the network device recorded by the recording unit.

7. The information processing apparatus according to claim 1, further comprising a recording unit configured to record a result of previous detection of the network device,
    wherein the control unit executes detection of the target network device by changing an order of using the first detection unit and the second detection unit according to the result of previous detection of the network device recorded by the recording unit.

8. The information processing apparatus according to claim 1, wherein the network device is a printer.

9. The information processing apparatus according to claim 1, wherein when the second detection unit executes a request by the unicast to a part of the addresses in the range of addresses to be targeted, the control unit executes a request by the unicast to an address different from an address to which the previous request was made by the unicast.

10. The information processing apparatus according to claim 1, wherein the identification information for detection confirmation of a target network device stored in advance is at least one of an MAC address, a serial number, and a network service name of the network device.

11. A method for detecting a target network device by comparing identification information for detection confirmation of the target network device stored in advance and identification information acquired from a network device on a network, the method comprising:
    setting a range of addresses to be targeted when the network device on the network is detected;
    executing first detection for detecting the target network device by requesting a response including the identification information of the network device from the network device on the network using broadcast or multicast;
    executing second detection for detecting the target network device by requesting a response including the identification information of the network device from the network device on the network using unicast in the set range of the addresses to be targeted; and
    controlling a process that includes:

executing a request by the broadcast or the multicast in the first detection, and repeating until the target network device can be detected, when the response is not returned from the target network device, executing a request by the unicast to a part of the addresses to which a request has not been executed in the range of addresses to be targeted during the second detection, and when the target network has not been detected, executing a request by the broadcast or the multicast during the first detection.

12. A non-transitory computer readable storage medium which stores a computer program for causing a computer to execute a method for detecting a target network device by comparing identification information for detection confirmation of the target network device stored in advance and identification information acquired from a network device on a network, the method comprising:

setting a range of addresses to be targeted when the network device on the network is detected;

executing first detection for detecting the target network device by requesting a response including the identification information of the network device from the network device on the network using broadcast or multicast;

executing second detection for detecting the target network device by requesting a response including the identification information of the network device from the network device on the network using unicast in the set range of the addresses to be targeted; and controlling a process that includes:

executing a request by the broadcast or the multicast in the first detection, and repeating until the target network device can be detected, when the response is not returned from the target network device, executing a request by the unicast to a part of the addresses to which a request has not been executed in the range of addresses to be targeted during the second detection, and when the target network has not been detected, executing a request by the broadcast or the multicast during the first detection.

* * * * *